United States Patent Office 2,988,472

Patented June 13, 1961

1

2,988,472

METHOD FOR CONTROL OF SOIL BORNE PATHOGENIC ORGANISMS

John J. D'Amico, Charleston, W. Va., assignor to Monsanto Chemical Company, St. Louis, Mo., a corporation of Delaware No Drawing. Filed July 14, 1959, Ser. No. 826,928
2 Claims. (Cl. 167—22)

The present invention is concerned with the fumigation of soil or growth media and is particularly directed to a method for the control of soil borne pathogenic organisms which attack the underground parts of plants and germinating seedlings.

According to the present invention is has been discovered that soil borne pathogenic organisms which attack the underground parts of plants and germinating seedlings may be controlled by impregnating the soil or growth media with allyl thiolcarbamate.

The toxicant may be applied to soil in a variety of forms. It may be applied conveniently in the form of a dispersion in an aqueous carrier. Although insoluble in water the toxicant is soluble in organic solvents, as for example acetone, chloroform, ethyl alcohol, ethyl acetate, benzene, ether and heptane. The ester may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents. Alternatively, the ester may be adsorbed on finely divided or granular carriers, as for example clay, pyrophyllite, silica and fuller's earth. Excellent results are obtained by application to the soil surface but it is preferred to work the composition into the top few inches of soil. A concentration of 50 parts per million of soil corresponds to a dosage of 100 pounds per six-inch acre. In general, a compound should be active at 60 pounds per acre (30 p.p.m.) to be economically feasible and the compound of this invention is active at this concentration and below. Amounts within the range of 10–60 pounds per acre comprise an effective range toxic to fungi and germinating seedlings. Weeds from the following plant families are controlled to varying degrees: Leguminosae, Cucurbitaceae, Embellifereae, Chenopodiaceae, Amaranthaceae, Convolvulaceae and Aizoaceae.

Activity as fungicides was demonstrated against "damping off" fungi. Those present were principally Pythium, Rhizoctonia and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots and 15 seeds of each of 2 crop plants sown in each pot. The crop plants were Dalta Pine No. 15 cotton and Straight Eight cucumber. The seeded pots were then incubated at 70° F. at 98% humidity to insure activity of the organisms in the soil. 24 hours later, the pots were removed to a greenhouse and disease assessments made within 10–14 days. The percent emergence and disease incidence was recorded. The ratings were based on inoculated, untreated and un-

2 inoculated, sterile soil treatments. For convenience in recording the data, the following rating scale was used:

| Rating: | Disease incidence (healthy plants out of 30) |
|---|---|
| 1 | 25–30 |
| 2 | 19–24 |
| 3 | 13–18 |
| 4 | 8–12 |
| 5 | 0–7 |

The results are recorded below:

TABLE I

| Toxicant | Conc., p.p.m. | Soil Fungicide Rating |
|---|---|---|
| Allyl thiolcarbamate | 10 | 1 |
| | 3 | 2 |

To demonstrate herbicidal activity the toxicant was emulsified in water and applied as a spray to the soil of seeded plots before the plants emerged. The plants employed are designated by letter in Table II. The plants corresponding to the letters are as follows:

A. Wild oat
B. Brome grass
C. Rye grass (domestic)
D. Buckwheat
E. Mustard (radish)
F. Red clover
G. Sugar beet
H. Cotton
J. Cucumber
K. Corn
L. Foxtail

TABLE II

*Pre-emergence*

| Toxicant | Rate, Lbs. per Acre | A | B | C | D | E | F | G | H | J | K | L |
|---|---|---|---|---|---|---|---|---|---|---|---|---|
| Allyl thiolcarbamate | 25 | 0 | 2 | 1 | 0 | 0 | 1 | 3 | 1 | 2 | 3 | 1 |

Other unsaturated groups may replace allyl, as for example vinyl, butenyl and propargyl radicals.

It is intended to cover all changes and modifications of the examples of the invention herein chosen for purposes of disclosure which do not constitute departures from the spirit and scope of the invention.

This application is a continuation-in-part of application Serial No. 642,925, filed February 28, 1957, now Patent No. 2,941,880.

What is claimed is:

1. The method of treating soil which comprises applying to fungi infested soil in a quantity sufficient to destroy fungi a compound of the structure

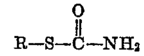

where R is a lower unsaturated acyclic radical.

2. The method of treating soil which comprises applying to fungi infested soil in a quantity sufficient to destroy fungi allyl thiolcarbamate.

References Cited in the file of this patent

UNITED STATES PATENTS

| | | |
|---|---|---|
| Re. 22,750 | Tisdale | Apr. 30, 1946 |
| 2,650,876 | Stewart | Sept. 1, 1953 |
| 2,710,259 | Blake | June 7, 1955 |
| 2,744,898 | Harman | May 8, 1956 |